United States Patent
Yamamoto et al.

(10) Patent No.: US 10,780,901 B2
(45) Date of Patent: Sep. 22, 2020

(54) RAIL CAR AIR-CONDITIONING DEVICE, AND RAIL CAR AIR-CONDITIONING DEVICE DRIVING METHOD

(71) Applicant: MITSUBISHI ELECTRIC CORPORATION, Chiyoda-ku, Tokyo (JP)

(72) Inventors: Hiroshi Yamamoto, Tokyo (JP); Mitsumasa Nishimura, Tokyo (JP); Sumie Takemura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 101 days.

(21) Appl. No.: 16/067,686

(22) PCT Filed: Jan. 6, 2017

(86) PCT No.: PCT/JP2017/000328
§ 371 (c)(1),
(2) Date: Jul. 2, 2018

(87) PCT Pub. No.: WO2017/119504
PCT Pub. Date: Jul. 13, 2017

(65) Prior Publication Data
US 2019/0001999 A1 Jan. 3, 2019

(30) Foreign Application Priority Data
Jan. 8, 2016 (JP) .................................. 2016-002267

(51) Int. Cl.
*B61D 27/00* (2006.01)
*B60H 1/32* (2006.01)
(Continued)

(52) U.S. Cl.
CPC ........... *B61D 27/0072* (2013.01); *B60H 1/32* (2013.01); *B61D 27/0018* (2013.01);
(Continued)

(58) Field of Classification Search
CPC ........................ B61D 27/0072; B61D 27/0018
See application file for complete search history.

(56) References Cited

U.S. PATENT DOCUMENTS

| 5,605,053 A | 2/1997 | Otori |
| 2005/0044868 A1 | 3/2005 | Kobayashi et al. |

(Continued)

FOREIGN PATENT DOCUMENTS

| CN | 101861252 A | 10/2010 |
| EP | 1 091 178 A2 | 4/2001 |

(Continued)

OTHER PUBLICATIONS

JP-2002067670-A translation.*
(Continued)

*Primary Examiner* — Elizabeth J Martin
(74) *Attorney, Agent, or Firm* — Buchanan Ingersoll & Rooney PC (57) ABSTRACT

A rail car air-conditioning device is equipped with: a refrigerant circuit that has a compressor and an outdoor heat exchanger; an outdoor blower; a compressor operation frequency deriver that derives a compressor operation frequency of the compressor on the basis of a rail car interior setting temperature and a rail car interior temperature; an inverter for compressor use that drives the compressor at the compressor operation frequency; an outdoor blower operation frequency deriver that, in accordance with a predetermined correspondence relationship, derives a blower operation frequency of the outdoor blower corresponding to the compressor operation frequency; and an inverter for outdoor
(Continued)

blower use that drives the outdoor blower at the blower operation frequency. The outdoor blower operation frequency deriver has a highly energy efficient energy-saving mode and a low-energy efficiency low-noise mode, and can switch between the energy-saving mode and the low-noise mode.

7 Claims, 8 Drawing Sheets

(51) Int. Cl.
  *F25B 39/04* (2006.01)
  *F25B 49/02* (2006.01)
(52) U.S. Cl.
  CPC ............ *F25B 39/04* (2013.01); *F25B 49/022* (2013.01); *Y02T 10/88* (2013.01); *Y02T 30/42* (2013.01)

(56) References Cited

U.S. PATENT DOCUMENTS

| | | | | |
|---|---|---|---|---|
| 2015/0258874 A1* | 9/2015 | Hegar | ............... | B60H 1/00371 701/36 |
| 2015/0280631 A1* | 10/2015 | Osamura | ............... | H02P 23/14 318/461 |

FOREIGN PATENT DOCUMENTS

| JP | 08-028937 A | | 2/1996 |
|---|---|---|---|
| JP | 08-271067 A | | 10/1996 |
| JP | 09-089347 A | | 4/1997 |
| JP | 09-119696 A | | 5/1997 |
| JP | 10-030853 A | | 2/1998 |
| JP | 11-245807 A | | 9/1999 |
| JP | 2001-108323 A | | 4/2001 |
| JP | 2002-067670 A | | 3/2002 |
| JP | 2002067670 A | * | 3/2002 |
| JP | 2003-254589 A | | 9/2003 |
| JP | 2003-329285 A | | 11/2003 |
| JP | 2005-075306 A | | 3/2005 |
| JP | 2012-247150 A | | 12/2012 |
| JP | 2014-012449 A | | 1/2014 |

OTHER PUBLICATIONS

Office Action dated Feb. 28, 2019, by the Chinese Patent Office in corresponding Chinese Patent Application No. 201780005385.2 and English translation of the Office Action. (12 pages).
International Search Report (PCT/ISA/210) dated Mar. 7, 2017, by the Japan Patent Office as the International Searching Authority for International Application No. PCT/JP2017/000328.
Written Opinion (PCT/ISA/237) dated Mar. 7, 2017, by the Japan Patent Office as the International Searching Authority for International Application No. PCT/JP2017/000328.
Office Action dated Oct. 22, 2019, issued in corresponding Chinese Patent Application No. 201780005385.2, 16 pages including 10 pages of English translation.
Office Action dated Mar. 20, 2020, by the Chinese Patent Office in corresponding Chinese Patent Application No. 201780005385.2 and English translation of the Office Action. (16 pages).

* cited by examiner

RAIL CAR AIR-CONDITIONING DEVICE, AND RAIL CAR AIR-CONDITIONING DEVICE DRIVING METHOD

TECHNICAL FIELD

The present disclosure relates to a rail car air-conditioning device, and a rail car air-conditioning device driving method.

BACKGROUND ART

One problem for railway companies is the suppression of overall power consumption of a rail car. Suppression of power consumption is desirable also for a rail car air-conditioning device.

The rail car air-conditioning device is one source of noise from the standpoint of passengers in the rail car or on a station platform. Thus noise generated by the rail car air-conditioning device is preferably decreased when the rail car is stopped at the station platform.

In consideration of such circumstances, a rail car air-conditioning device is proposed that is equipped with a function for suppression of noise. For example, in Patent Literature 1, a rail car air-conditioning device is proposed that lowers rail car internal noise by stopping operation or decreasing an operation amount of ventilation devices and air-conditioning devices when speed of the rail car decreases upon nearing a station at which the rail car is to stop.

Further, in Patent Literature 2, a method of operation of an air-conditioning device is proposed that suppresses noise by controlling a rotation frequency of a compressor in response to a rotation frequency of an indoor blower.

Further, in Patent Literature 3, a cooling cycle device is proposed that has various modes of operation of a compressor and an outdoor blower, the modes being consistent with goals of energy saving and noise prevention. A mode is selected from among the various modes in accordance with a time schedule, and the compressor and the outdoor blower are operated at frequencies in response to the selected mode.

CITATION LIST

Patent Literature

Patent Literature 1: Unexamined Japanese Patent Application Kokai Publication No. 2005-75306

Patent Literature 2: Unexamined Japanese Patent Application Kokai Publication No. H8-271067

Patent Literature 3: Unexamined Japanese Patent Application Kokai Publication No. 2012-247150

SUMMARY OF INVENTION

Technical Problem

For the rail car air-conditioning device disclosed in Patent Literature 1, in the vicinity of the station, the amount of operation of the ventilation device and the air-conditioning device decreases, or the ventilation device and the air-conditioning device stop, thus decreasing air conditioning capacity. Thus comfort within the rail car is sacrificed. Further, although the rail car air-conditioning device disclosed in Patent Literature 1 can suppress rail car internal noise, this rail car air-conditioning device cannot suppress noise outside the rail car. Thus this rail car air-conditioning device cannot contribute to the prevention of noise for people such as passengers on the platform. Further, energy saving operation is not considered in Patent Literature 1.

The object of the method of operation disclosed in Patent Literature 2 is the suppression of rail car internal noise. Thus the method of operation disclosed in Patent Literature 2 is difficult to apply to the suppression of noise outside the rail car. Further, energy saving operation is not considered in Patent Literature 2.

The cooling cycle device disclosed in Patent Literature 3 is an installed-type device that operates the compressor and the outdoor blower in accordance with the time schedule, and thus the operation method of this cooling cycle device is difficult to apply to the rail car air-conditioning device. Further, in Patent Literature 3, there is no consideration concerning how to control the compressor and the outdoor blower.

In consideration of the aforementioned circumstances, an objective of the present disclosure is to provide a rail car air-conditioning device, and a rail car air-conditioning device driving method that are capable of energy saving operation and that, more than heretofore, decrease car-external noise as the rail car approaches the station.

Solution to Problem

In order to attain the aforementioned objective, the rail car air-conditioning device according to the present disclosure includes:

a refrigerant circuit including (i) a compressor to compress a refrigerant and (ii) an outside air heat exchanger to perform heat exchange between the refrigerant and outside air;

a blower to blow the outside air into the outside air heat exchanger;

a compressor operation frequency deriver to, based on a setting temperature and a rail car interior temperature, derive a compressor operation frequency of the compressor;

a compressor driver to drive the compressor at the compressor operation frequency derived by the compressor operation frequency deriver;

a blower operation frequency deriver to derive, in accordance with a predetermined correspondence relationship, a blower operation frequency of the blower corresponding to the compressor operation frequency derived by the compressor operation frequency deriver; and a blower driver to drive the blower at the blower operation frequency derived by the blower operation frequency deriver. The blower operation frequency deriver sets the correspondence relationship by selection of one mode from among multiple modes that include at least a first operation mode and a second operation mode. In the first operation mode, an energy efficiency of the refrigerant circuit relative to the compressor operation frequency is higher than that of the second operation mode, and the blower operation frequency corresponding to the compressor operation frequency is higher than the blower operation frequency corresponding to the same compressor operation frequency when prescribed in the second operation mode. In the second operation mode, the blower operation frequency increases as the compressor operation frequency increases, and the blower operation frequency corresponding to the compressor operation frequency is lower than the blower operation frequency corresponding to the same compressor operation frequency when prescribed in the first operation mode.

Advantageous Effects of Invention

According to the aforementioned configuration, by switching between the first operation mode for which energy efficiency is high and the second operation mode for which the blower operation frequency is low, the rail car air-conditioning device can be run according to location by switching the degree of energy efficiency and also the degree of generated noise. Thus the present disclosure enables the providing of the rail car air-conditioning device that enables energy-saving operation and has lower rail car-exterior noise than heretofore when the rail car approaches the station.

DESCRIPTION OF EMBODIMENTS

A rail car air-conditioning device, and a rail car air-conditioning device driving method according to the present disclosure are described below with reference to drawings.

A rail car air-conditioning device 100 according to the present embodiment is equipped with an air-conditioning system control unit 200 for causing operation of a compressor 3 and an outdoor blower 5 in an energy-saving mode or a low-noise mode. The rail car air-conditioning device 100 is installed on the roof or under the floor, and conditions air within the rail car. In the below description, firstly configuration and operation are described for components other than the air-conditioning system control unit 200 of the rail car air-conditioning device 100. Thereafter, the configuration and operation of the air-conditioning system control unit 200 are described.

Figure 1:
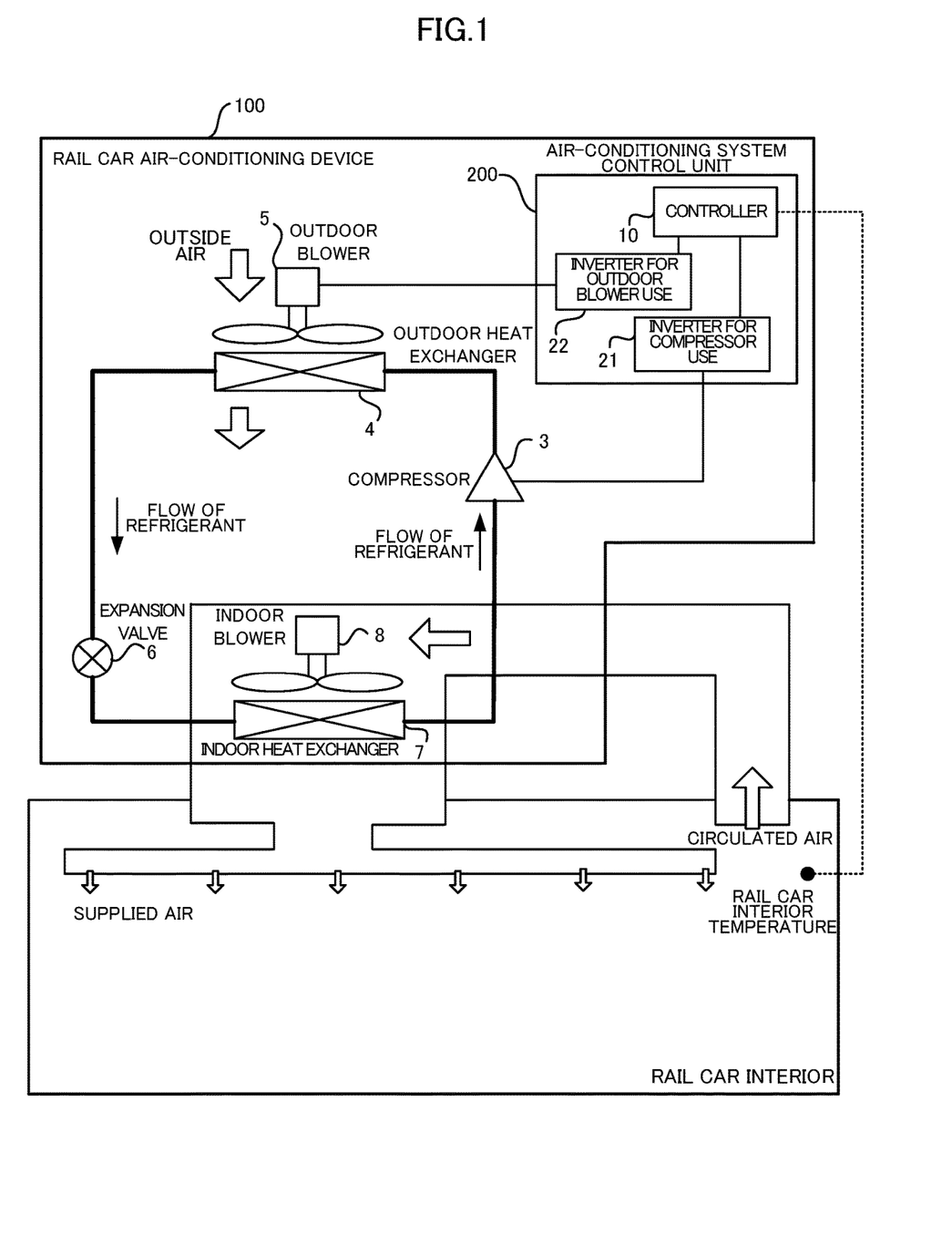
FIG. 1 is a configuration drawing of a rail car air-conditioning device according to an embodiment of the present disclosure.

As illustrated in FIG. 1, the rail car air-conditioning device 100 is equipped with the compressor 3 for compression of a refrigerant, an outdoor heat exchanger 4 for performing heat exchange between outside air and the refrigerant, the outdoor blower 5 for blowing the outside air into the outdoor heat exchanger 4, an expansion valve 6 for causing expansion of the refrigerant, an indoor heat exchanger 7 for performing heat exchange between rail car internal air and the refrigerant, and an indoor blower 8 for blowing the rail car internal air into the indoor heat exchanger 7. Further, the compressor 3, the outdoor heat exchanger 4, the expansion valve 6, and the indoor heat exchanger 7 are connected by piping, in order, as the compressor 3, the outdoor heat exchanger 4, the expansion valve 6, and the indoor heat exchanger 7. Further, the compressor 3 and the indoor heat exchanger 7 are connected together by piping. These components form a loop-like refrigerant circuit that circulates the refrigerant.

The compressor 3 is configured as a rotary compressor, a scroll compressor, and the like. The compressor 3 is equipped with a three-phase motor functioning as a drive motor, and is capable of variable speed driving by inverter control. Due to rotation of the three-phase motor, the compressor 3 compresses the refrigerant. Here, the expression "operation frequency of the compressor 3" means the number of compressions per unit time, such as per second or per minute. The operation frequency of the compressor 3 is also termed the "compressor operation frequency" in the present specification.

The outdoor heat exchanger 4 includes refrigerant tubing and fins for transmitting heat of the refrigerant tubing to the outside air. The outdoor heat exchanger 4 is disposed outside the rail car. The outdoor heat exchanger 4 during cooling causes heat to move from the refrigerant to the outside air, and during heating causes heat to move from the outside air to the refrigerant. Here, the term "outside air" refers to the air outside the rail car, that is, the air external to the rail car. The outdoor heat exchanger 4 in the present specification is also termed the "outside air heat exchanger".

The outdoor blower 5 is equipped with a fan and a three-phase motor that functions as a drive motor of the fan. The three-phase motor is capable of variable speed driving by inverter control. The fan is rotated by the three-phase motor, blows the outside air into the outdoor heat exchanger 4, and blows the outside air after heat exchange again to the exterior of the vehicle. Here, the expression "operation frequency of the outdoor blower 5" means the rotation frequency of the fan per unit time, such as per second or per minute. The operation frequency of the outdoor blower 5 is also termed the "blower operation frequency" in the present specification. Due to rotation of the fan, the outdoor blower 5 generates sound such as wind noise and rotational noise. Such sound is noise at the exterior of the vehicle. The volume of such sound changes with the rotation frequency of the fan.

In the aforementioned refrigerant circuit, the expansion valve 6 functions as a throttling mechanism between the high-pressure-side piping and the low-pressure-side piping. For example, when the rail car air-conditioning device 100 performs the cooling operation, by adjusting the passing amount of liquid-state refrigerant, the expansion valve 6 allows expansion of the refrigerant to form refrigerant at low temperature and low pressure. A portion of the refrigerant vaporizes when the refrigerant passes through the expansion valve 6. That is to say, the expansion valve 6 causes foaming of the refrigerant.

The expansion valve 6 has variable-type throttling in order to respond to changes in the cooling capacity of the rail car air-conditioning device 100. In the refrigerant circuit, the circulation amount of the refrigerant becomes less when throttling by the expansion valve 6 is strong. At this time, the refrigerant of the indoor heat exchanger 7 vaporizes, and the heat exchange amount of the indoor heat exchanger 7 is lowered. That is to say, the cooling capacity of the rail car air-conditioning device 100 is suppressed. However, when throttling by the expansion valve 6 is weak, the circulation amount of the refrigerant of the refrigerant circuit increases, and the cooling capacity of the rail car air-conditioning device 100 increases. However, when the throttling by the expansion valve 6 is excessively weak, the heat exchange capacity of the indoor heat exchanger 7 is exceeded, and the refrigerant, while remaining in the liquid state, flows from the indoor heat exchanger 7 to the compressor 3. In this case, the compressor 3 may be damaged by the occurrence of liquid compression. Thus the expansion valve 6 has the aforementioned variable-type throttling in order to prevent liquid compression by the compressor 3 while maintaining the cooling capacity of the rail car air-conditioning device 100. Thus in the case in which the cooling capacity of the rail car air-conditioning device 100 is varied over a wide range by variable speed driving by inverter control of the compressor 3 and the outdoor blower 5, the throttling amount can be changed, and liquid compression can be prevented. Further, in the case of open-close throttling, the expansion valve 6 is preferably an adjustable electronic linear expansion valve. The throttling amount is referred to below as the "degree of opening". In this case, the degree of opening of the throttling is preferably controlled by the air-conditioning system control unit 200.

The indoor heat exchanger 7 includes refrigerant tubing and fins in the same manner as the outdoor heat exchanger 4. Further, the indoor heat exchanger 7 is disposed within the rail car. The indoor heat exchanger 7 moves heat from the rail car internal air to the refrigerant during cooling, and moves heat from the refrigerant to the rail car internal air during heating. Here, the term "rail car internal" means within the compartment of the rail car.

The indoor blower 8 is equipped with a fan and a three-phase motor in the same manner as the outdoor blower 5. By sending the rail car internal air into the indoor heat exchanger 7, the indoor blower 8 causes heat exchange with the refrigerant passing through the indoor heat exchanger 7, and releases again to the vehicle interior the heat-exchanged air.

Operation of the rail car air-conditioning device 100 is described next. By switching of a non-illustrated four-way valve, the rail car air-conditioning device 100 cools or heats the rail car internal air. During the cooling operation of the rail car air-conditioning device 100, due to the four-way valve, the refrigerant circulates through the refrigerant circuit in a direction, in order, as the compressor 3, the outdoor heat exchanger 4, the expansion valve 6, the indoor heat exchanger 7, and the compressor 3. The refrigerant is compressed by the compressor 3 to change to gas at high pressure and temperature, and then flows into the outdoor heat exchanger 4. After flowing into the outdoor heat exchanger 4, the refrigerant exchanges heat with the outside air supplied by the outdoor blower 5, is cooled and compressed, and becomes liquid-state refrigerant. The liquefied refrigerant is changed to refrigerant at low temperature and low pressure by expansion and pressure reduction by the expansion valve 6. The refrigerant at low temperature and low pressure flows into the indoor heat exchanger 7, and changes, due to heat exchange with the rail car internal air blown by the indoor blower 8, to gaseous refrigerant at low temperature and low pressure. The gaseous refrigerant at low temperature and low pressure flows into the compressor 3, is compressed, and thus becomes gaseous refrigerant at high temperature and high pressure. However, the rail car internal air is blown by the indoor blower 8 into the indoor heat exchanger 7, exchanges heat with the refrigerant at low temperature and low pressure, and becomes low temperature air. This low temperature air is supplied to the vehicle interior, and the rail car internal air is cooled.

However, during heating operation of the rail car air-conditioning device 100, due to the four-way valve, the refrigerant circulates through the refrigerant circuit in a direction, in order, as the compressor 3, the indoor heat exchanger 7, the expansion valve 6, the outdoor heat exchanger 4, and the compressor 3. The refrigerant is compressed by the compressor 3 to change to a gas at high temperature and pressure, and then flows into the indoor heat exchanger 7. After flowing into the indoor heat exchanger 7, the refrigerant exchanges heat with the rail car internal air, and is cooled and compressed. This refrigerant is allowed to expand by the expansion valve 6, and decreases in pressure. The pressure-reduced refrigerant flows into the outdoor heat exchanger 4, exchanges heat with the outside air at the outdoor heat exchanger 4, and thus becomes gaseous refrigerant at low temperature and low pressure. The gaseous refrigerant at low temperature and low pressure flows into the compressor 3, is compressed by the compressor 3, and thus becomes gaseous refrigerant at high temperature and high pressure. However, the rail car internal air is blown by the indoor blower 8 into the indoor heat exchanger 7, exchanges heat with the high temperature refrigerant, and becomes high temperature air. This high temperature air is supplied to the vehicle interior, and the rail car internal air is heated.

Further, except for the flow of the refrigerant in the refrigerant circuit, operation is the same during the heating operation and during the cooling operation of the rail car air-conditioning device 100. Thus in the below description of the operation of rail car air-conditioning device 100 to condition the air within the rail car, operation during the cooling operation is described as an example of such air-conditioning operation.

Configuration of the air-conditioning system control unit 200 for achievement of the aforementioned operation is described next. The air-conditioning system control unit 200 is equipped with a controller 10 for determining the operation frequency of the compressor 3 and the operation frequency of the outdoor blower 5, an inverter 21 for compressor use for driving the compressor 3 at the operation frequency determined by the controller 10, and an inverter 22 for outdoor blower use for driving the outdoor blower 5 at the operation frequency determined by the controller 10.

The controller 10 finds an operation frequency fc of the compressor 3 and an operation frequency ff of the outdoor blower 5 corresponding to an energy-saving mode for energy saving and a low-noise mode for noise reduction. In each mode, in order to change the air-conditioning capacity of the rail car air-conditioning device 100 as required in accordance with the outside air temperature, the rail car interior setting temperature, a number of passengers, and the like, the controller 10 finds operation frequencies fc and ff corresponding to the outside air temperature, the rail car interior setting temperature, and the like. Here, when the operation frequency fc of the compressor 3 is high, the amount of the refrigerant flowing through the refrigerant circuit increases, and the air-conditioning capacity of the rail car air-conditioning device 100 increases. However, when the operation frequency ff of the outdoor blower 5 is high, the amount of heat exchange by the outdoor heat exchanger 4 increases, and the air-conditioning capacity increases. The controller 10 transmits the found operation frequency fc as notification to the inverter 21 for compressor use, transmits the found operation frequency ff as notification to the inverter 22 for outdoor blower use, and drives the compressor 3 and the outdoor blower 5 at a required air-conditioning capacity. Further, details of the performance of the controller 10 are described below with reference to FIG. 4.

Further, the controller 10 determines the degree of opening of the expansion valve 6 and controls the expansion valve 6 so as to operate at the determined degree of opening. The degree of opening of the expansion valve 6 is determined, for example, by either one of the below described two methods, or is determined by a combination of these methods. In the first method, the controller 10 determines the degree of opening of the expansion valve 6 in accordance with the operation frequency fc of the compressor 3, and opens-closes the expansion valve 6 at the determined degree of opening. Specifically, the controller 10 adjusts the degree of opening of the expansion valve 6 so as to increase with increased operation frequency fc of the compressor 3, and adjusts the degree of opening of the expansion valve 6 so as to decrease with decreased operation frequency fc. In the second method, the controller 10 measures the temperatures of an inlet port and an outlet port of a heat exchanger, determines the degree of opening of the expansion valve 6 such that a difference between these temperatures becomes an appropriate constant value, and opens-closes the expansion valve 6 at the determined degree of opening. The term "heat exchanger" for this method refers to the indoor heat exchanger 7 in the case of cooling, and refers to the outdoor heat exchanger 4 in the case of heating.

Figure 2:
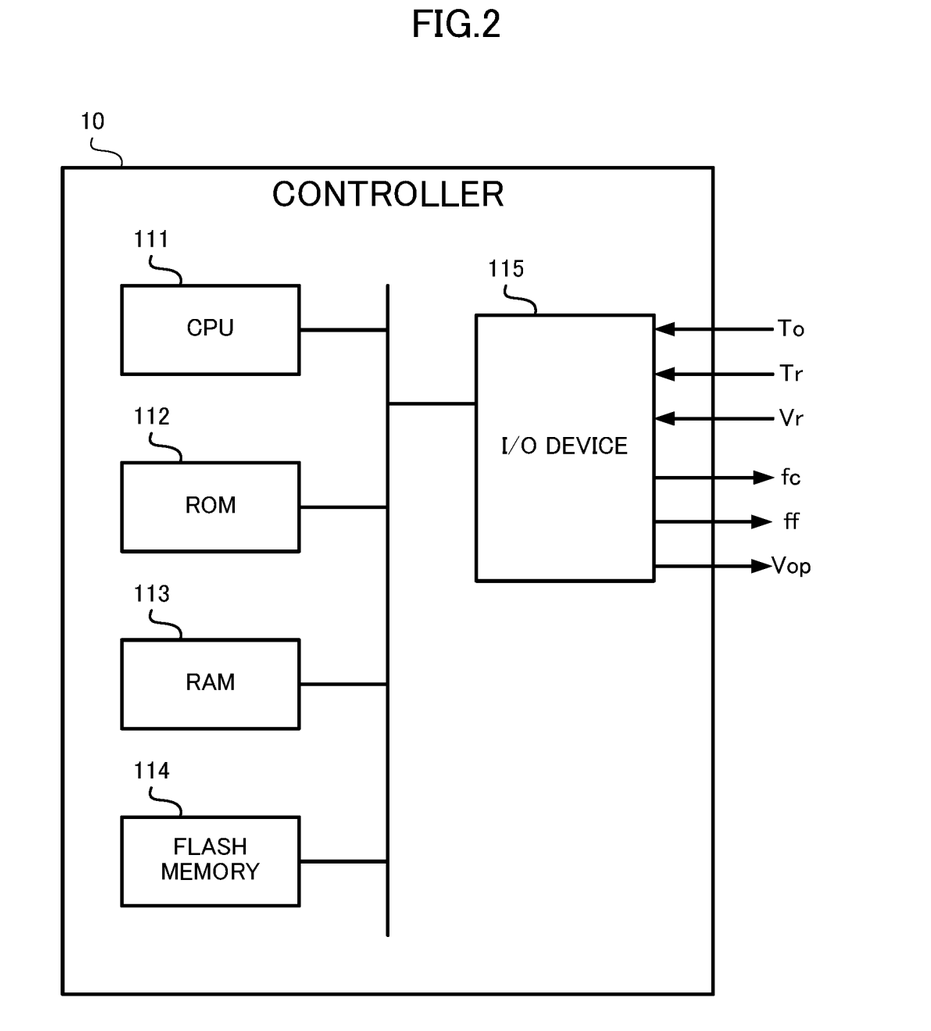
FIG. 2 is a block diagram illustrating an internal configuration of a controller illustrated in FIG. 1.

In order to achieve the aforementioned functions, the controller 10 is equipped, as illustrated in FIG. 2, with a central processing unit (CPU) 111, a read-only memory (ROM) 112, a random access memory (RAM) 113, a flash memory 114, and an input/output (I/O) device 115.

The ROM 112 stores information such as an operational program executed by the CPU 111 and fixed data. Contents of the operational program are described below.

The RAM 113 functions as a main memory and a work area of the CPU 111. The flash memory 114 is a non-volatile memory, and stores information such as functions F1 and F2 indicating relationships between the compressor operation frequency fc and the outdoor blower operation frequency ff, and a threshold Vth of vehicular speed for switching between the energy-saving mode and the low-noise mode. The functions F1 and F2 are described below with reference to FIG. 3 and FIG. 4.

The I/O device 115 executes input-output processing between the CPU 111 and an external device. For example, via the I/O device 115, the CPU 111 receives a rail car interior setting temperature To from a higher-level device, a manual input device, and the like, and receives a rail car interior temperature Tr and a rail car speed Vr that are actually measured by a sensor. Further, the I/O device 115 transmits the compressor operation frequency fc as notification to the inverter 21 for compressor use, transmits the outdoor blower operation frequency ff as notification to the inverter 22 for outdoor blower use, and transmits to the expansion valve 6 a valve degree-of-opening control signal Vop designating the degree of opening thereof.

Using the RAM 113 as a work area, the CPU 111 executes an air-conditioning program stored in the ROM 112 and finds the compressor operation frequency fc and the outdoor blower operation frequency ff by using the data and functions F1 and F2 stored in the flash memory 114 and data received via the I/O device 115. Via the I/O device 115, the CPU 111 transmits to the inverter 21 for compressor use notification of the compressor operation frequency fc and transmits to the inverter 22 for outdoor blower use notification of the outdoor blower operation frequency ff. Further, the CPU 111 finds the appropriate degree of opening of the expansion valve 6 on the basis of the compressor operation frequency fc, and outputs to the expansion valve 6 the valve degree-of-opening control signal Vop designating the found degree of opening thereof.

Figure 3:
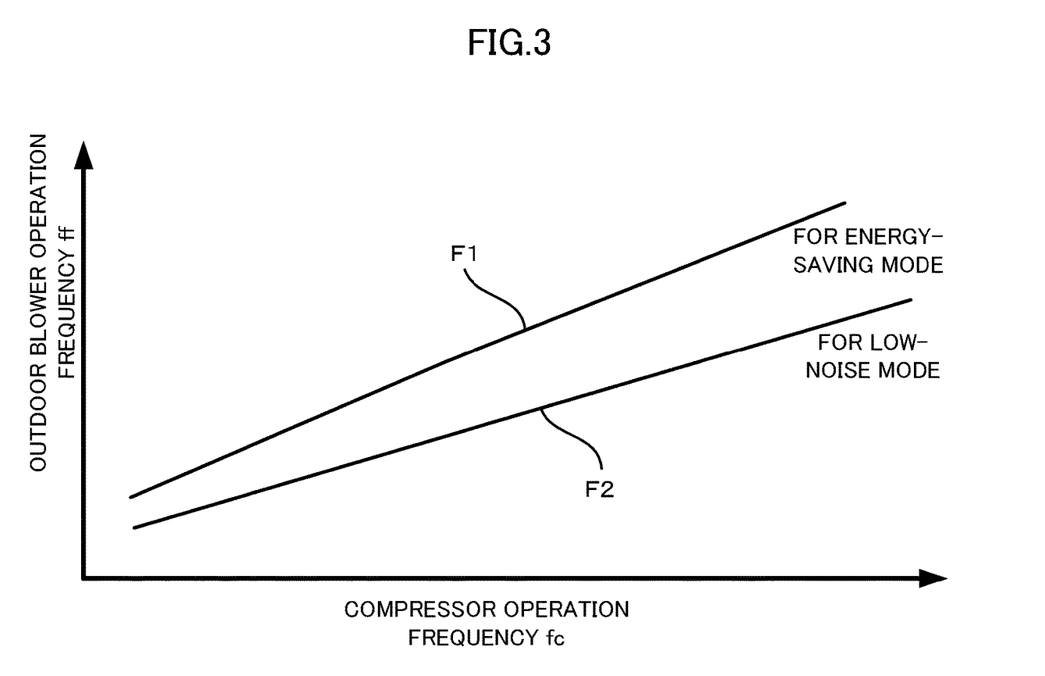
FIG. 3 is a chart illustrating functions, defining a correspondence relationship between an operation frequency of a compressor and an operation frequency of an outdoor blower, and occurring in an energy-saving mode (first operation mode) and a low-noise mode (second operation mode)

As illustrated in FIG. 3, the flash memory 114 stores an energy-saving mode function F1 (also referred to as the "first function" or "first relationship") and a low-noise mode function F2 (also referred to as the "second function" or "second relationship"), both indicating a correlation between the compressor operation frequency fc and the outdoor blower operation frequency ff.

The energy-saving mode function F1 specifies a correlation between the compressor operation frequency fc and the outdoor blower operation frequency ff when the rail car air-conditioning device 100 is operated so as to maximize the coefficient of performance (abbreviated as COP throughout the specification).

The low-noise mode function F2 specifies a correlation between the compressor operation frequency fc and the outdoor blower operation frequency ff when the rail car air-conditioning device 100 is operated so as to achieve as much energy saving as possible while suppressing noise from the outdoor blower 5. Slope of the low-noise mode function F2 is smaller than slope of the energy-saving mode function F1. Further, the outdoor blower operation frequency ff corresponding to the compressor operation frequency fc is lower for the low-noise mode function F2 than for the energy-saving mode function F1. That is, if a first operation frequency is taken to be that of the energy-saving mode function F1, and if a second operation frequency is taken to be that of the low-noise mode function F2, then the first operation frequency is greater than the second operation frequency.

The energy-saving mode function F1 and the low-noise mode function F2 are devised beforehand on the basis of the following considerations, and are stored in the flash memory 114.

Figure 4:
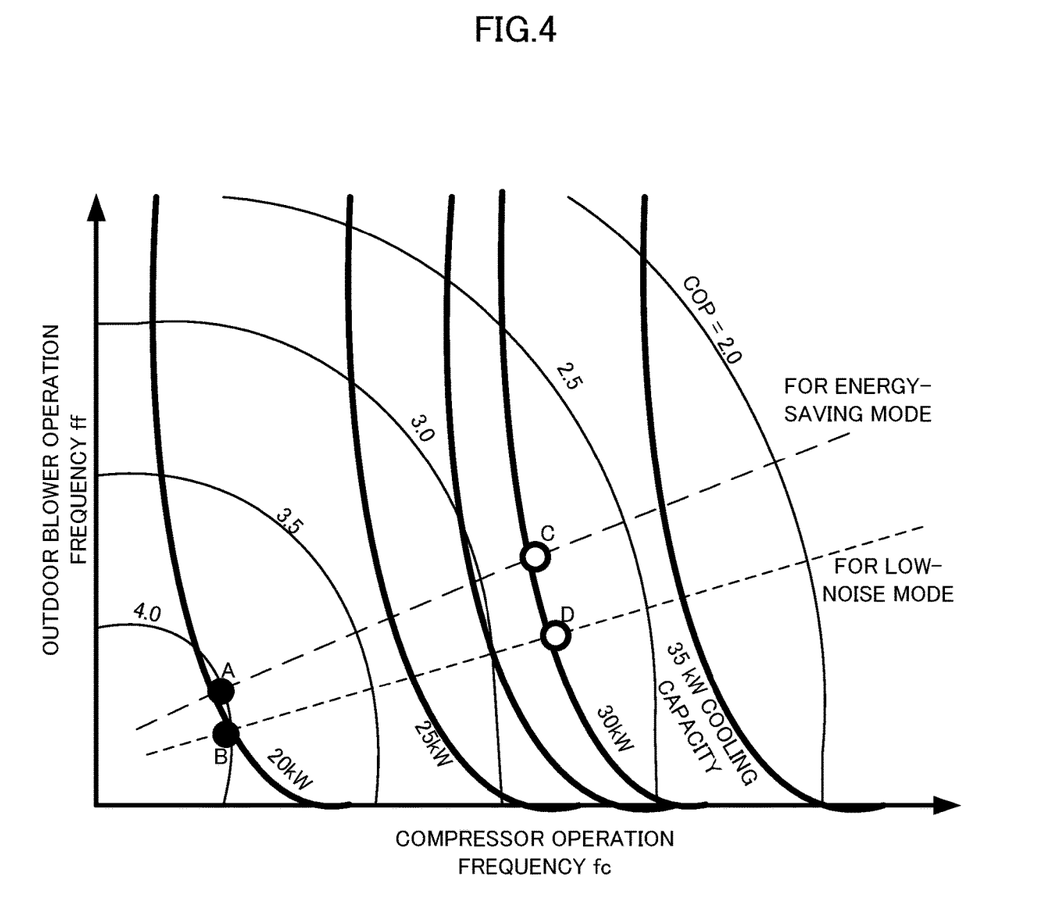
FIG. 4 is a chart illustrating relationships between the operation frequency of the compressor, the operation frequency of the outdoor blower, a cooling capacity, COP, the energy-saving mode, and the low-noise mode.

An operational map illustrated in FIG. 4 is a chart illustrating relationships between the operation frequency fc of the compressor 3, the operation frequency ff of the outdoor blower 5, the cooling capacity, and the COP during the cooling operation of the rail car air-conditioning device 100. In FIG. 4, the operation frequency fc of the compressor 3 is plotted along the horizontal axis, and the operation frequency ff of the outdoor blower 5 is plotted along the vertical axis. Further, the bold lines are contour lines of the cooling capacity, and the thin lines are contour lines of COP. Here, COP is taken to be the (cooling capacity)/(sum of the power consumptions of the compressor 3 and the outdoor blower 5). The operation frequency fc of the compressor 3 and the operation frequency ff of the outdoor blower 5 when the COP is maximum indicate a state of high energy efficiency so as to obtain the required cooling capacity with low power consumption by the compressor 3 and the outdoor blower 5.

In FIG. 4, the contour lines indicating the cooling capacity indicate the same numerical value of the cooling capacity by a single curved line. For example, the contour line for 30 kW cooling capacity is indicated by a single curved line. Similarly, the contour lines indicating COP indicate the same numerical value of COP by a single curved line. As illustrated in FIG. 4, the cooling capacity increases with increased operation frequency fc of the compressor 3, although cooling capacity decreases with decreased operation frequency ff of the outdoor blower 5. Conversely, the cooling capacity decreases with decreased operation frequency fc of the compressor 3, although the cooling capacity increases with increased operation frequency ff of the outdoor blower 5. In contrast, COP decreases with increase in the operation frequency fc of the compressor 3 or the operation frequency ff of the outdoor blower 5.

In FIG. 4, a point at which the maximum COP is obtained at the cooling capacity of 20 kW is the intersection point A of intersection between the contour line of 20 kW cooling capacity and the contour line of 4.0 COP. In this manner, the line interconnecting the intersection points of the respective curves for the cooling capacity and COP is a line of maximum COP. Thus during normal operation (first operation mode), energy saving is enabled by running the compressor 3 and the outdoor blower 5 at respective operation frequencies occurring on this line. By consideration in this manner, the energy-saving mode function F1 is set to the function corresponding to this line. The energy-saving mode function F1 regulates the operation frequency ff of the outdoor blower 5 relative to the operation frequency fc of the compressor 3 occurring in the energy-saving mode.

However, when the rail car is stopped at a station, for example, passengers on the platform may feel the sound from the outdoor blower 5 as noise. In order to decrease such noise, the operation frequency ff of the outdoor blower 5 is preferably decreased when the rail car is stopped at the station. When the rotation frequency of the outdoor blower 5 can be varied by inverter control, noise can be decreased by lowering this rotation frequency. Further, in the case of lowering noise while maintaining the cooling capacity, rather than decreasing the operation frequency of the outdoor blower 5, the operation frequency of the compressor 3 can be increased.

Thus the line used for the low-noise mode (second operation mode), for example, is taken to have a slope smaller than the slope of the aforementioned energy-saving line in FIG. 4, and to be a straight line passing through a point B that is on the COP equal to 4.0 line and located where the operation frequency of the outdoor blower 5 is lower than for the aforementioned point A. Further, the compressor 3 and the outdoor blower 5 are controlled so as to operate at the operation frequencies fc and ff on this line when achievement of low noise is necessary. The low-noise mode function F2 is the function corresponding to this line. The low-noise mode function F2 regulates the operation frequency ff of the outdoor blower 5 relative to the operation frequency fc of the compressor 3 occurring in the low-noise mode.

Selection of the operation frequency fc of the compressor 3 and the operation frequency ff of the outdoor blower 5 is described concretely as follows. For example, in the case of selection of the energy-saving mode when a cooling capacity of 30 kW is required, the compressor 3 and the outdoor blower 5 operate at the operation frequencies fc and ff, respectively, of a point C. COP is about 2.75 at the point C. When the low-noise mode is selected such as when the rail car is stopped at the station, if the cooling capacity of 30 kW is also required even at this time, the compressor 3 and the outdoor blower 5 operate at the operation frequency fc and ff, respectively, of a point D. The operation frequency ff of the outdoor blower 5 at this time becomes smaller than in the case of the point C, and noise from the outdoor blower 5 can be decreased, although the operation frequency fc of the compressor 3 increases in order to maintain the cooling capacity of 30 kW.

In the present embodiment, although normally the energy-saving mode is selected, and the compressor 3 and the outdoor blower 5 are controlled, when a low-noise state is required, the mode is switched to the low-noise mode. Criteria for switching between the energy-saving mode and the low-noise mode, and the methods for mode selection and switching, are described below.

In FIG. 4, as the slope of the low-noise mode line (function F2) decreases, and as the intercept of the line with the axis on which the outdoor blower operation frequency ff is plotted decreases, noise from the outdoor blower 5 decreases. However, use of such control alone would lower the cooling capacity and decrease rail car internal comfort. However, when the operation frequency fc of the compressor 3 is increased so as not to lower the cooling capacity, noise from the compressor 3 increases. Further, due to high discharge capacity of the compressor 3, pressure of the refrigerant cannot be lowered by the expansion valve 6, and a problem occurs in that refrigerant remaining in the liquid state flows into the compressor 3. In this manner, the low-noise mode line is required to satisfy multiple mutually contradictory conditions. A logical low-noise mode line exists, and a lower limit value exists for the slope of the line. The appropriate line can be obtained by methods such as numerical calculation and experimentation. The slope of the low-noise mode line is found, on the basis of investigation by the present inventors, to preferably be $4/5$ to $2/3$ of the energy-saving mode line (function F1).

Figure 5:
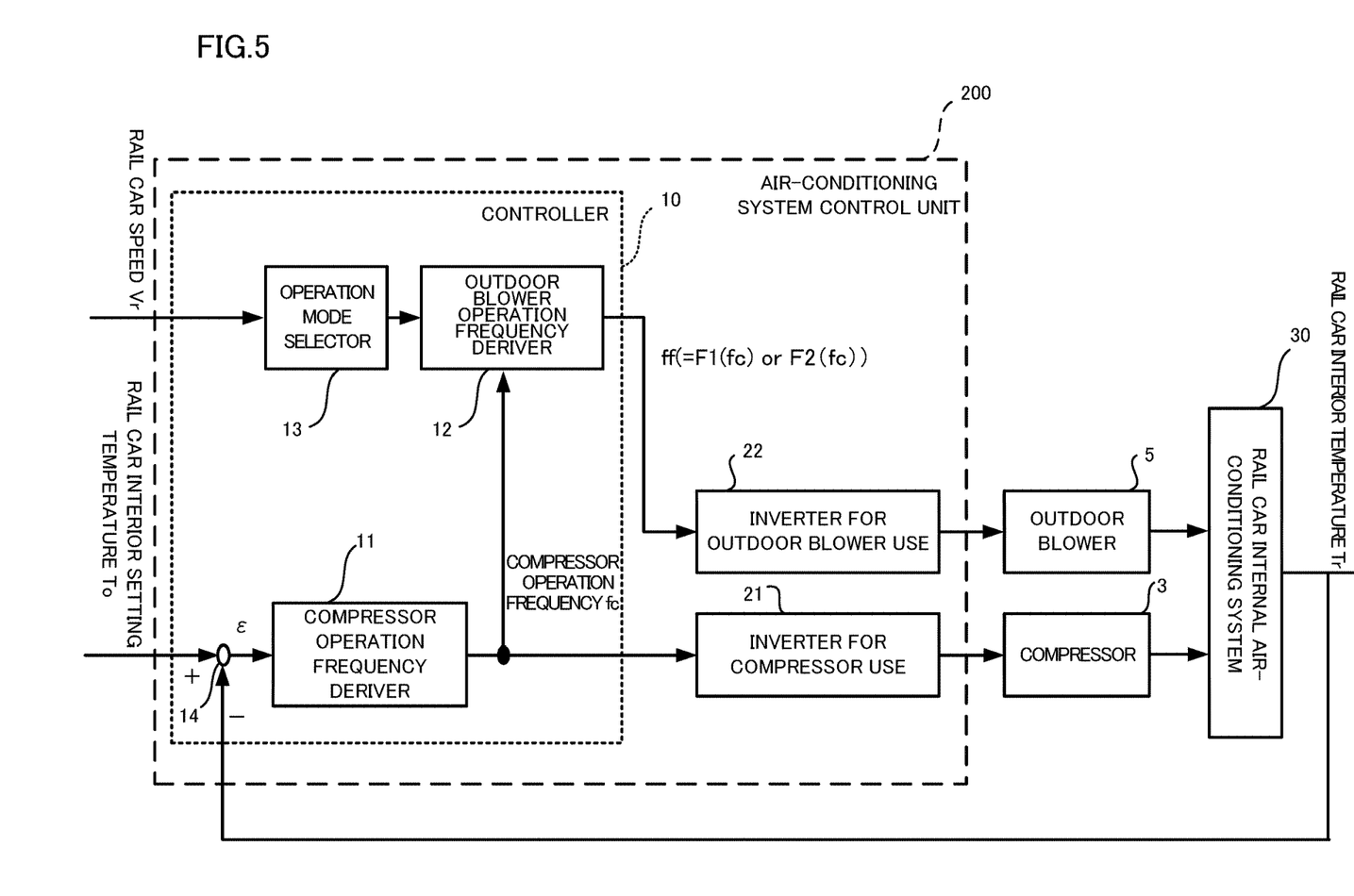
FIG. 5 is a block diagram illustrating operation control of the compressor and the outdoor blower occurring in the embodiment.

The functions illustrated in FIG. 3 are the energy-saving mode function F1 and the low-noise mode function F2 designed in consideration of the aforementioned circumstances. The controller 10 functions to cause driving of the outdoor blower 5 and the compressor 3 using the energy-saving mode function F1 and the low-noise mode function F2. Specifically, as illustrated in FIG. 5, by the CPU 111 executing the air-conditioning program stored in the ROM 112, the controller 10 functions as a compressor operation frequency deriver 11, an outdoor blower operation frequency deriver 12, an operation mode selector 13, and a subtracter 14.

The subtracter 14 finds a deviation ε (equal to To−Tr) between the rail car interior setting temperature To and the actual measured rail car interior temperature Tr measured by the temperature sensor, and supplies the deviation ε to the compressor operation frequency deriver 11.

The compressor operation frequency deriver 11, on the basis of the deviation ε found by the subtracter 14, derives the operation frequency fc of the compressor 3 by proportional-integral (PI) control, and transmits notification of the derived operation frequency fc to the inverter 21 for compressor use and the outdoor blower operation frequency deriver 12.

The outdoor blower operation frequency deriver 12 uses the energy-saving mode function F1 or the low-noise mode function F2, in accordance with the operation mode selected by the operation mode selector 13, illustrated in FIG. 3 to derive the outdoor blower operation frequency ff corresponding to the compressor operation frequency fc. The outdoor blower operation frequency deriver 12 transmits notification of the derived outdoor blower operation frequency ff to the inverter 22 for outdoor blower use.

In circumstances such as when the rail car is stopped at the station, the operation mode selector 13 determines whether a state exists in which the release of noise to the exterior is to be decreased, and upon determination such a state does not exist, the operation mode selector 13 selects the energy-saving mode. Upon determination that the state exists in which the release of noise to the exterior is to be decreased, the operation mode selector 13 selects the low-noise mode. Specifically, the operation mode selector 13 selects the energy-saving mode if a rail car speed Vr measured by a speed sensor is greater than or equal to a threshold Vth, and selects the low-noise mode if the rail car speed Vr is less than the threshold Vth. Further, the operation mode selector 13 transmits to the outdoor blower operation frequency deriver 12 notification of the selected operation mode.

The inverter 21 for compressor use controls frequency of the inverter signal thereof so as to cause the compressor 3 to operate at an operation frequency that matches the compressor operation frequency fc transmitted as notification from the compressor operation frequency deriver 11. The inverter 21 for compressor use is also termed the "compressor driver" in the present specification.

The inverter 22 for outdoor blower use controls the frequency of the inverter signal thereof so as to cause operation of the outdoor blower 5 at an operation frequency that matches the outdoor blower operation frequency ff as transmitted from the outdoor blower operation frequency deriver 12. The inverter 22 for outdoor blower use is also termed the "blower driver" in the present specification.

Air-conditioning operation of the air-conditioning system control unit 200 configured in the aforementioned manner is described next. Firstly, the rail car is assumed to be in the normal operating state, and the rail car speed Vr of the rail car is assumed to be greater than or equal to the threshold Vth.

The subtracter 14 finds the deviation ε between the rail car interior setting temperature To and the fed-back rail car interior temperature Tr.

The compressor operation frequency deriver 11 uses PI control to find the compressor operation frequency (operation amount) fc corresponding to the deviation ε, and transmits notification of the found compressor operation frequency fc to the inverter 21 for compressor use. Further, the compressor operation frequency deriver 11 transmits notification of the compressor operation frequency fc to the outdoor blower operation frequency deriver 12.

The rail car speed Vr is greater than or equal to the threshold Vth, and thus the operation mode selector 13 selects the energy-saving mode (first operation mode). The outdoor blower operation frequency deriver 12 finds a uniquely determined outdoor blower operation frequency ff (equal to F1(fc)) applicable for thee energy-saving mode function F1 by use of the transmitted notification of compressor operation frequency fc, and transmits notification of the found outdoor blower operation frequency ff to the inverter 22 for outdoor blower use.

The inverter 21 for compressor use generates an inverter signal so as to cause operation of the compressor 3 at the compressor operation frequency fc of the transmitted notification, and supplies this inverter signal to the drive motor of the compressor 3. In the same manner, the inverter 22 for outdoor blower use generates an inverter signal so as to cause operation of the outdoor blower 5 at the outdoor blower operation frequency ff of the transmitted notification, and supplies the generated inverter signal to the drive motor of the outdoor blower 5. Cooled air is sent to the rail car internal air-conditioning system 30 due to such operation.

The compressor 3 is driven by the inverter signal for compressor use supplied from the inverter 21 for compressor use, and compresses and circulates the refrigerant as described with reference to FIG. 1. However, the outdoor blower 5 is driven by the inverter signal for outdoor blower use supplied from the inverter 22 for outdoor blower use, and facilitates heat exchange between the outside air and the refrigerant by the outdoor heat exchanger 4.

Execution of feedback control continues in this manner so that the rail car interior temperature Tr matches the rail car interior setting temperature To, and thus the deviation ε becomes small.

Next, the rail car is assumed to approach a station, and the rail car speed Vr is assumed to become less than the threshold Vth. Also in this case, the subtracter 14 finds the deviation ε between the rail car interior setting temperature To and the rail car interior temperature Tr. The compressor operation frequency deriver 11 uses PI control, in the same manner as in the energy-saving mode, to find the compressor operation frequency fc corresponding to the deviation ε. The compressor operation frequency deriver 11 transmits notification of the found compressor operation frequency fc to the inverter 21 for compressor use and the outdoor blower operation frequency deriver 12. The inverter 21 for compressor use generates the inverter signal for causing operation of the compressor 3 at the transmitted compressor operation frequency fc, and supplies this inverter signal to the drive motor of the compressor 3. The compressor 3 is driven by the supplied inverter signal, and compresses and circulates the refrigerant as described with reference to FIG. 1. This operation is substantially the same as that of the control in the energy-saving mode.

However, due to the rail car speed Vr being below the threshold Vth, the operation mode selector 13 selects the low-noise mode (second operation mode). The outdoor blower operation frequency deriver 12 uses the transmitted notification of the compressor operation frequency fc in the low-noise mode function F2, and finds the corresponding outdoor blower operation frequency ff (equal to F2(fc)). The outdoor blower operation frequency deriver 12 transmits notification of the found outdoor blower operation frequency ff to the inverter 22 for outdoor blower use. This outdoor blower operation frequency ff (equal to F2(fc)), as described with reference to FIG. 4, is smaller than the outdoor blower operation frequency ff (equal to F1(fc)) with respect to the same compressor operation frequency fc when in the energy-saving mode. The inverter 22 for outdoor blower use generates the inverter signal so as to cause operation of the outdoor blower 5 at the instructed outdoor blower operation frequency ff, and supplies this inverter signal to the drive motor of the outdoor blower 5. The outdoor blower 5 is driven by the supplied inverter signal, and facilitates heat exchange between the outside air and the refrigerant by the outdoor heat exchanger 4. In this manner, cooled air is set to the rail car internal air-conditioning system 30.

The operation frequency ff of the outdoor blower 5 in the low-noise mode is smaller than the operation frequency ff of the outdoor blower 5 in the energy-saving mode with respect to the same compressor operation frequency fc. Thus release of noise to the exterior from the outdoor blower 5 is suppressed.

Immediately after the switching from the energy-saving mode to the low-noise mode, the operation frequency ff of the outdoor blower 5 drops rapidly, and thus air-conditioning capacity declines, and in normal circumstances, the rail car interior temperature rises. However, the elevated rail car interior temperature Tr is fed back, and the deviation ε becomes large so that the compressor operation frequency fc derived by the compressor operation frequency deriver 11 increases. Thus the air-conditioning capacity improves, and the rail car interior temperature Tr gradually approaches the rail car interior setting temperature To.

Although the outdoor blower operation frequency ff increases together with the increase of the compressor operation frequency fc, due to basing of the outdoor blower operation frequency ff on the low-noise mode function F2 that has a relatively small slope, the increase in noise is suppressed. The execution of such control operation continues in the low-noise mode.

When the rail car leaves the station and the rail car speed Vr becomes greater than or equal to the threshold Vth, operation in the energy-saving mode starts again.

Figure 6:
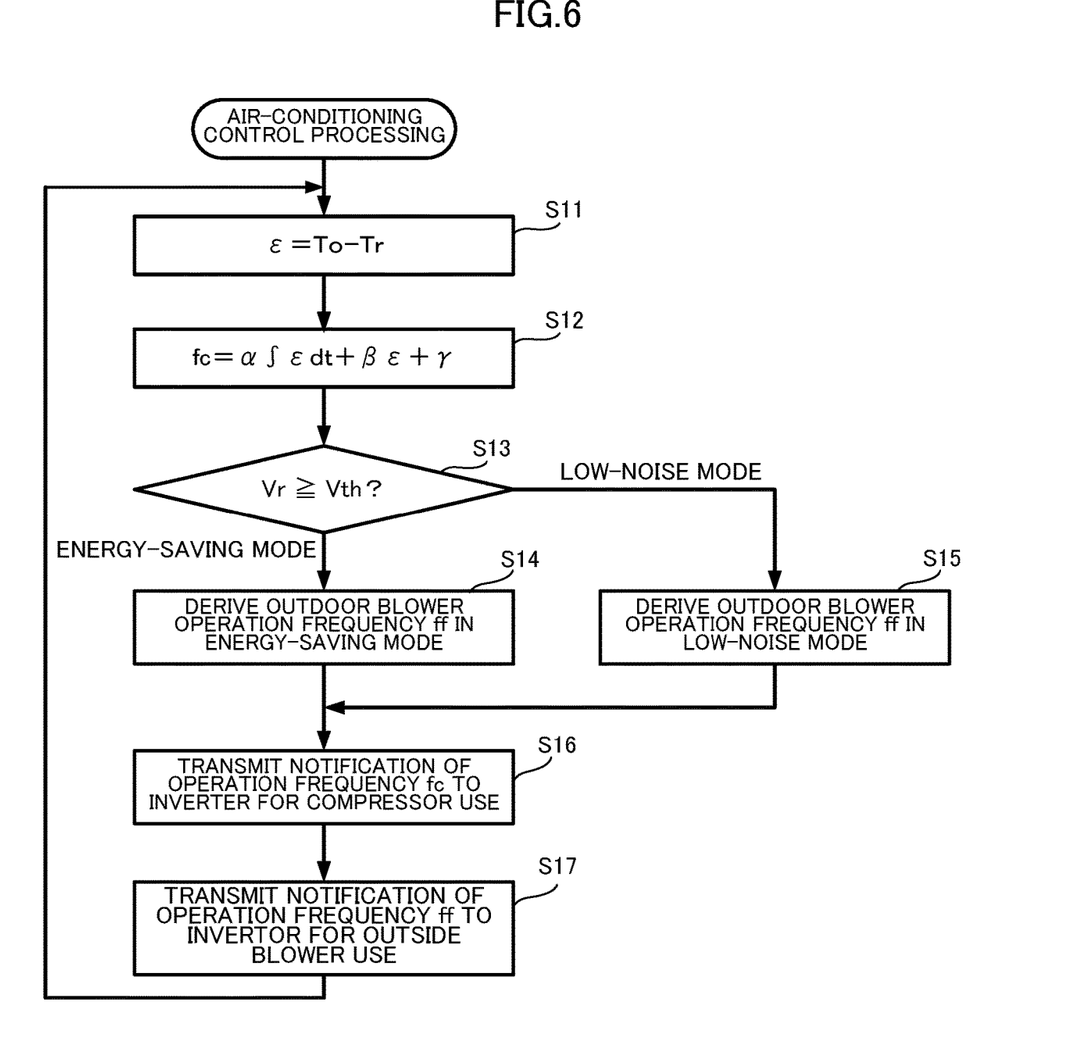
FIG. 6 is a flowchart illustrating operation of a CPU illustrated in FIG. 2.

FIG. 6 is a flowchart illustrating the aforementioned cooling operation when expressed in terms of processing by the CPU 111.

Upon the startup of air-conditioning control, the CPU 111 starts the air-conditioning control processing illustrated in FIG. 6, and finds the deviation ε between the rail car interior temperature Tr supplied via the I/O device 115 from the sensor and the like and the rail car interior setting temperature To that is stored in the flash memory 114 (step S11).

Thereafter, the CPU 111 determines the compressor operation frequency (operation amount) fc from the deviation ε of PI control and a relational expression fc=α∫εdt+βε+γ for the compressor operation frequency fc that is the operation amount (step S12). α, β, and γ are constants.

Thereafter, the CPU 111 determines whether the rail car speed Vr obtained via the I/O device 115 is greater than or equal to the threshold Vth stored in the flash memory 114 (step S13).

If Vr is greater than or equal to Vth, the CPU 111 selects the energy-saving mode (step S13, energy-saving mode), and applies the compressor operation frequency fc found in step S12 to the energy-saving mode function F1 to find the outdoor blower operation frequency ff (equal to F1(fc)) (step s14). Thereafter, the CPU 111 via the I/O device 115 transmits notification of the compressor operation frequency fc to the inverter 21 for compressor use (step S16), and transmits notification of the outdoor blower operation frequency ff to the inverter 22 for outdoor blower use (step S17).

However, if Vr is less than Vth, the CPU 111 selects the low-noise mode (step S13, low-noise mode), and applies the compressor operation frequency fc found in step S13 to the low-noise mode function F2 to find the outdoor blower operation frequency ff (equal to F2(fc)) (step S15). Thereafter, the CPU 111 via the I/O device 115 transmits notification of the compressor operation frequency fc to the inverter 21 for compressor use (step S16), and transmits notification of the outdoor blower operation frequency ff to the inverter 22 for outdoor blower use (step S17).

Here, the CPU 111 may determine the degree of opening of the expansion valve 6, and may transmit to the expansion valve 6 notification of the valve degree-of-opening control signal Vop to provide instruction designating the degree of opening thereof. Further, the aforementioned steps may be executed such that the order of steps is partially or entirely changed.

In this manner, during normal operation when the rail car is distant from the station and there is no requirement for the suppression of noise, the rail car air-conditioning device 100 according to the present embodiment controls the operation frequency fc of the compressor 3 on the basis of the deviation ε between the rail car interior setting temperature To and the rail car interior temperature Tr, and sets the operation frequency ff of the outdoor blower 5 to the operation frequency ff uniquely determined to correspond to the operation frequency fc of the compressor 3 on the basis of COP. Thus the rail car air-conditioning device 100 operates in a highly efficient and energy-saving manner.

However, when the suppression of noise release to the outside is required in circumstances such as when the rail car is stopped at the station, the rail car air-conditioning device 100, while controlling the operation frequency fc of the compressor 3 in the same manner as during normal operation, sets the operation frequency ff of the outdoor blower 5 to the frequency that corresponds to the operation frequency fc of the compressor 3 and that is lower than the outdoor blower operation frequency during the energy-saving mode. Thus the rail car air-conditioning device 100 can suppress noise Although the aforementioned embodiment is an example that uses a speed sensor for detection of the rail car speed Vr, this configuration is not limiting. The rail car air-conditioning device 100 may use an output of an acceleration sensor, or from an output of a digital automatic train control (ATC) device or global positioning system (GPS), may find the vehicular speed and a distance between the rail car and the station, and may select the mode in accordance with the found distance.

Figure 7:
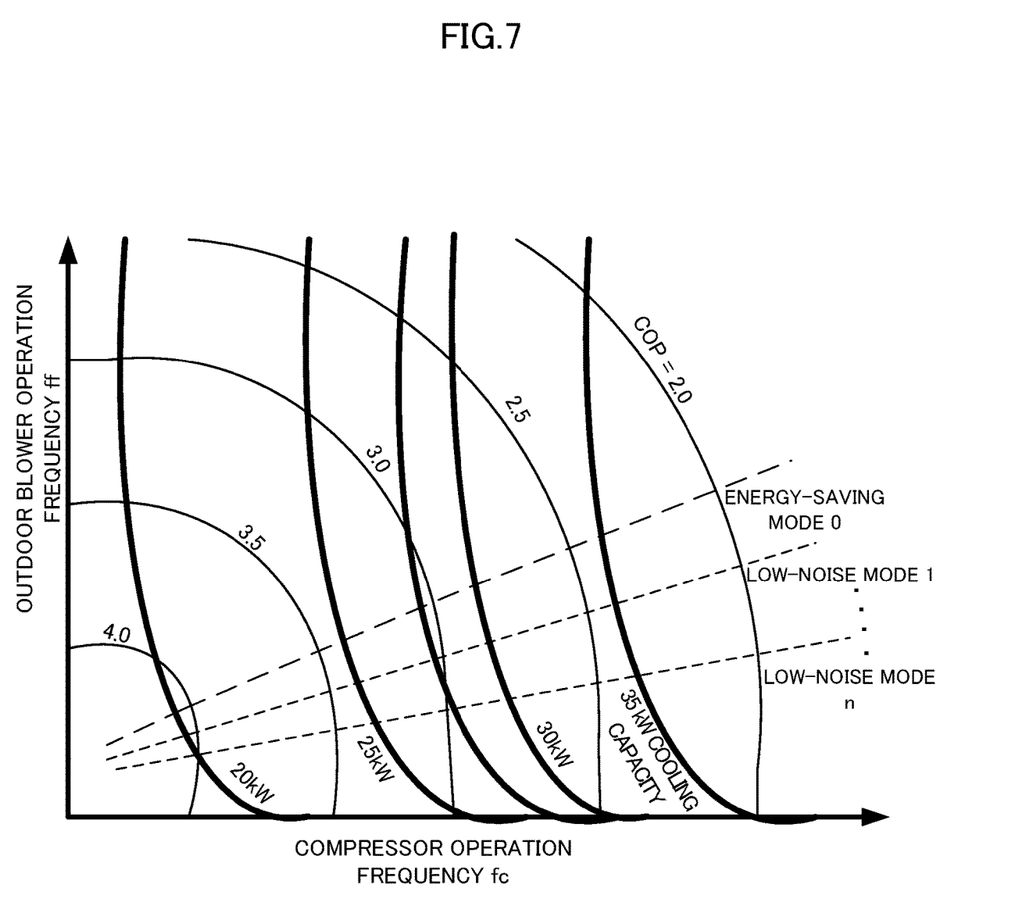
FIG. 7 is a chart illustrating relationships, during cooling operation, between the operation frequency of the compressor, the operation frequency of the outdoor blower, the cooling capacity, COP, the energy-saving mode, and first to n-th low-noise modes.

Although the set modes are the energy-saving mode (first operation mode) and the low-noise mode (second operation mode) in the aforementioned embodiment, the number of low-noise modes may be plural. For example, as illustrated in FIG. 7, the set modes may be one energy-saving mode (zeroth operation mode) and n low-noise modes (first through n-th operation modes), and the operation mode selector 13 may use different low-noise mode in accordance with the degree to which noise is to be suppressed. In the example of FIG. 7, the operation mode selector 13 may select the energy-saving mode when the rail car is sufficiently distant from the station, and may select the first to (n−1)-th low-noise mode, in order, when the rail car is approaching the station, that is, when the rail car speed Vr is decreasing. In this case, the operation mode selector 13 may be controlled so as to select the n-th low noise mode when the rail car is stopped (rail car speed Vr equal to 0), and to select the (n−1)-th to first low-noise mode, in order, while the rail car is becoming separated from the station (when the rail car speed Vr is increasing). Multiple thresholds Vth0 to Vth(n−1) may be used in this case.

Figure 8:
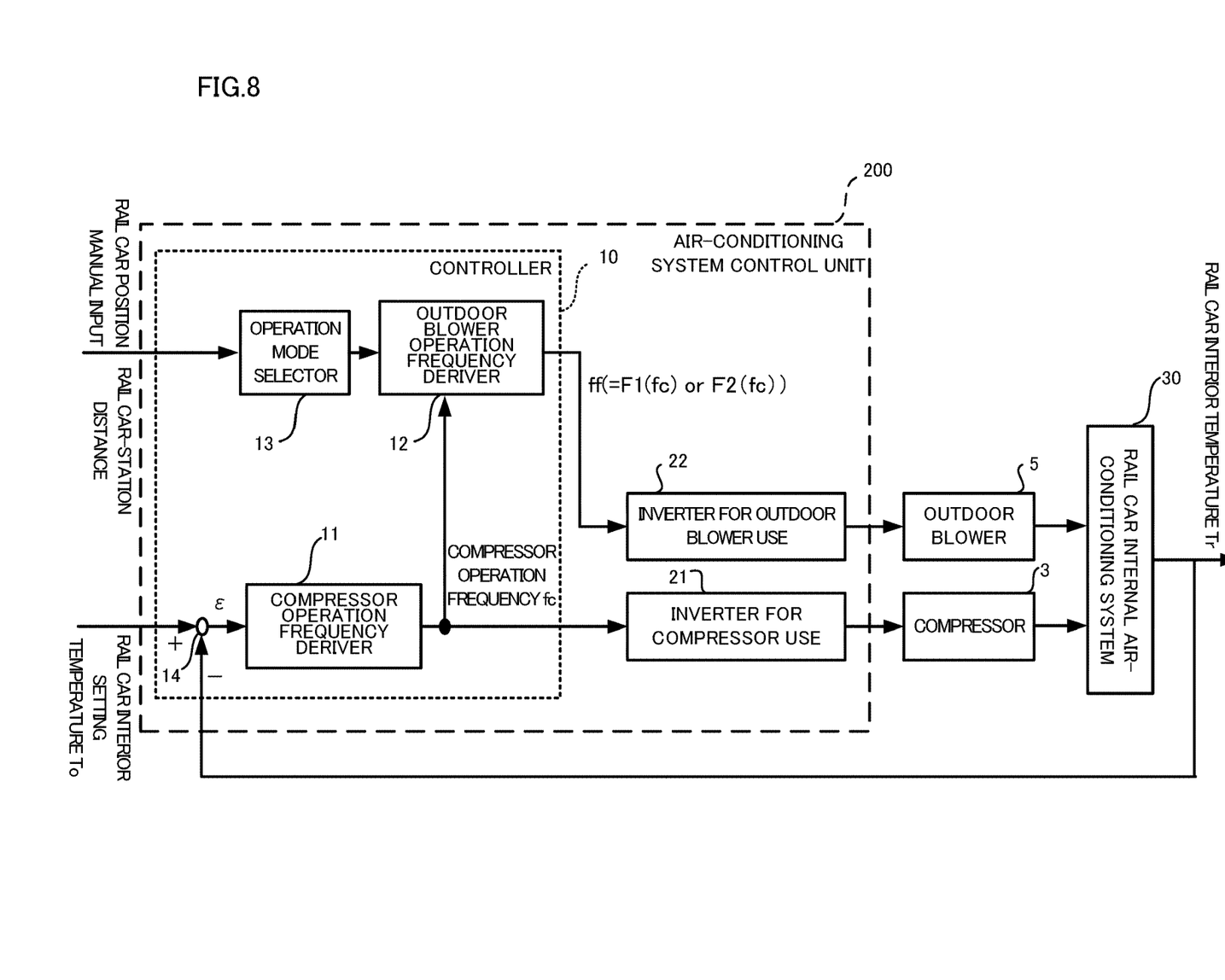
FIG. 8 is a block diagram illustrating an example of switching, by rail car position, manual input, and the like, to select the operation mode.

Further, although the operation mode is switched in accordance with the rail car speed in the aforementioned embodiment, as illustrated in FIG. 8, (i) the operation mode selector 13 may determine the operation mode by using the present position of the rail car and a position-operation mode map. In this case, the operation mode selector 13 stores a map of each position on a determined route and the operation mode to be selected at such positions, and an operation mode may be selected that corresponds to the present position as determined by a position measurement device such as a GPS. Further, (ii) the operation mode may be set manually by a driver or conductor. (iii) The operation mode selector 13 may find the distance between the station and the present position of the rail car, and may select the operation mode in accordance with the distance.

Further, although in the above example the controller 10 stores in the flash memory 114 the functions F1 and F2 used for finding the operation frequencies, any desired form of storage of the functions may be used, such as storage in the form of equations, or storage in the form of tables. Further, although the examples of the functions F1 and F2 are indicated as first-order functions, these functions may be expressed as higher-order curved functions. Further, the operational map illustrated in FIG. 4 may be stored, and the operation frequency may be obtained from the operation map.

Although the compressor operation frequency deriver 11 uses PI control in the aforementioned embodiment, the compressor operation frequency deriver 11 may use P control, PID control, and the like.

Further, in the aforementioned embodiments, the air-conditioning program may be distributed in the form of a computer-readable recording medium storing the program, such as a flexible disc, a compact disc read only memory (CD-ROM), a digital versatile disc (DVD), a magneto-optical disc (MO), and the like, and then by installing the program on a computer and the like, the computer may be configured to enable the achievement of the air-conditioning system control unit 200 executing the processing illustrated in FIG. 6.

Further, the aforementioned program may be stored on a disc device included in a designated server on a communication network such as the Internet, and for example, may be superimposed on a carrier wave, and then downloaded to the computer.

Further, when the aforementioned processing illustrated in FIG. 6 is achieved by allocation to various operating systems (OS) or is achieved by cooperation between the OS and an application, a portion, other than the OS portion, of the program may be stored and distributed on the medium, or may be downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-002267, filed on Jan. 8, 2016, the entire disclosure of which is incorporated by reference herein.

REFERENCE SIGNS LIST

3 Compressor
4 Outdoor heat exchanger
5 Outdoor blower
6 Expansion valve
7 Indoor heat exchanger
8 Indoor blower
10 Controller
11 Compressor operation frequency deriver
12 Outdoor blower operation frequency deriver
13 Operation mode selector
14 Subtracter
21 Inverter for compressor use
22 Inverter for outdoor blower use
30 Rail car internal air-conditioning system
100 Rail car air-conditioning device
111 CPU
112 ROM
113 RAM
114 Flash memory
115 I/O device
200 Air-conditioning system control unit

The invention claimed is:

1. A rail car air-conditioning device, comprising:
a refrigerant circuit comprising (i) a compressor to compress a refrigerant and (ii) an outside air heat exchanger to perform heat exchange between the refrigerant and outside air;
a blower to blow the outside air into the outside air heat exchanger;
a compressor operation frequency deriver to, based on a setting temperature and a rail car interior temperature, derive a compressor operation frequency of the compressor;
a compressor driver to drive the compressor at the compressor operation frequency derived by the compressor operation frequency deriver;
a blower operation frequency deriver to derive, in accordance with a predetermined correspondence relationship, a blower operation frequency of the blower corresponding to the compressor operation frequency derived by the compressor operation frequency deriver; and
a blower driver to drive the blower at the blower operation frequency derived by the blower operation frequency deriver,
wherein the blower operation frequency deriver sets the correspondence relationship by selection of one mode from among multiple modes that include at least a first operation mode and a second operation mode,
in the first operation mode, an energy efficiency of the refrigerant circuit relative to the compressor operation frequency is higher than that of the second operation mode, and the blower operation frequency corresponding to the compressor operation frequency is higher than the blower operation frequency corresponding to the same compressor operation frequency when prescribed in the second operation mode, and
in the second operation mode, the blower operation frequency increases as the compressor operation frequency increases, and the blower operation frequency corresponding to the compressor operation frequency is lower than the blower operation frequency corresponding to the same compressor operation frequency when prescribed in the first operation mode.

2. The rail car air-conditioning device according to claim 1, wherein the blower operation frequency deriver
in the first operation mode regulates a combination of the compressor operation frequency and the blower operation frequency such that an energy efficiency of the refrigerant circuit is maximized, and
in the second operation mode regulates a combination of the compressor operation frequency and the blower operation frequency such that the energy efficiency of the refrigerant circuit is lower than the energy efficiency in the first operation mode.

3. The rail car air-conditioning device according to claim 1, wherein the blower operation frequency deriver
stores (i) a first function regulating a correspondence relationship, used in the first operation mode, between the compressor operation frequency and the blower operation frequency, and (ii) a second function regulating a correspondence relationship, used in the second operation mode, between the compressor operation frequency and the blower operation frequency, the blower operation frequency corresponding to the same compressor operation frequency being lower than the blower operation frequency regulated by the first function, derives in the first operation mode the blower operation frequency by applying the correspondence relationship of the first function to the compressor operation frequency, and derives in the second operation mode the blower operation frequency by applying the correspondence relationship of the second function to the compressor operation frequency.

4. The rail car air-conditioning device according to claim 1, wherein the compressor operation frequency deriver comprises a subtracter to find a difference between the setting temperature and the rail car interior temperature, and an deriver to derive the compressor operation frequency for which the difference found by the subtracter is smaller.

5. The rail car air-conditioning device according to claim 1, wherein the compressor driver drives the compressor at variable speed, and the blower driver drives the blower at variable speed.

6. The rail car air-conditioning device according to claim 1, wherein the blower operation frequency deriver selects the first operation mode when a speed of a rail car is greater than or equal to a threshold, and selects the second operation mode when the speed of the rail car is less than the threshold.

7. A method of driving a rail car air-conditioning device comprising a compressor, an outside air heat exchanger, and a blower to blow outside air into the outside air heat exchanger, the method comprising:

driving the compressor at an operation frequency in accordance with a load;

driving the blower (i) in a first operation mode by converting a compressor operation frequency corresponding to the load of the compressor to a first operation frequency in accordance with a first relationship, and driving the blower at the converted first operation frequency, or (ii) in a second operation mode by converting the compressor operation frequency corresponding to the load of the compressor to a second operation frequency in accordance with a second relationship, and driving the blower at the converted second operation frequency, the second operation frequency being lower than the first operation frequency, the second operation frequency having a lower energy efficiency than that of the first relationship, the second operation frequency increasing as the compressor operation frequency increases; and reducing noise from the blower by switching from the first operation mode to the second operation mode, and increasing the energy efficiency by switching from the second operation mode to the first operation mode.

* * * * *